United States Patent [19]

Loiselle et al.

[11] Patent Number: 5,340,897
[45] Date of Patent: Aug. 23, 1994

[54] MOISTURE CURABLE ORGANOSILOXANE COATING COMPOSITIONS

[75] Inventors: Brian P. Loiselle; Bernard VanWert, both of Midland, Mich.

[73] Assignee: Dow Corning Corporation, Midland, Mich.

[21] Appl. No.: 101,638

[22] Filed: Aug. 4, 1993

[51] Int. Cl.$^5$ ............................................. C08G 77/06
[52] U.S. Cl. ........................................ 528/17; 528/35; 525/477; 525/479
[58] Field of Search .................... 528/17, 35; 525/479, 525/477

[56] References Cited

U.S. PATENT DOCUMENTS

| | | | |
|---|---|---|---|
| 3,175,993 | 3/1965 | Weyenberg | 260/46.5 |
| 3,294,739 | 12/1966 | Weyenberg | 260/46.5 |
| 3,334,067 | 8/1967 | Weyenberg | 260/46.5 |
| 4,528,081 | 7/1985 | Lien et al. | 204/159.13 |
| 4,568,566 | 2/1986 | Tolentino | 427/54.1 |
| 4,772,675 | 9/1988 | Klosowski et al. | 528/15 |
| 4,824,875 | 4/1989 | Gutek | 522/9 |
| 4,956,221 | 9/1990 | Gutek | 428/142 |
| 5,008,301 | 4/1991 | Dennis et al. | 522/13 |
| 5,082,894 | 1/1992 | VanWert et al. | 524/730 |

FOREIGN PATENT DOCUMENTS 2038350 10/1991 Canada .

*Primary Examiner*—Melvyn I. Marquis
*Attorney, Agent, or Firm*—Robert Spector

[57] ABSTRACT

Liquid organosilicon compounds containing at least one alkenyl radical per molecule are included as an ingredient of moisture curable organosiloxane compositions containing a liquid polydiorganosiloxane with alkoxysilalkylene terminal units and an organotitanium compound as the curing catalyst. The organosilicon compound reacts with silicon-bonded hydrogen atoms present in said composition, thereby preventing the generation of hydrogen during storage and/or curing of the composition. One source of silicon bonded hydrogen is one of the reactants used to prepare the polydiorganosiloxane.

4 Claims, No Drawings

MOISTURE CURABLE ORGANOSILOXANE COATING COMPOSITIONS

BACKGROUND OF THE INVENTION

This invention relates to moisture curable organosiloxane coating compositions. More particularly, this invention relates to organosiloxane coating compositions that contain less than 5 weight percent of solvents or reactive diluents and are sufficiently low in viscosity for application by conventional coating techniques. The compositions cure rapidly to durable elastomeric coatings exhibiting excellent adhesion to a variety of substrates without generating hydrogen gas during storage or curing.

Conformal coatings containing polyorganosiloxanes are known in the art, and are useful as protective coatings for electronic components and circuit boards on which these components are mounted. Canadian Pat. No. 2,038,350 describes coating compositions that cure in the presence of ultraviolet radiation. The compositions contain a silicone resin with ethylenically unsaturated hydrocarbon radicals, an organic mercaptan, an acrylate monomer and a photoinitiator.

U.S. Pat. No. 4,568,566 which issued to Tolentino on Feb. 4, 1986 describes silicone resins useful as the curable ingredient in conformal coatings. The resins are curable by light in the presence of a photoinitiator or by heating in the presence of a heat-activated free radical generator. The resin contains a group of the formula $C(R^1)=C(R^1)-C(O)OR^2$, where R1 is H or a hydrocarbyl radical containing from 1 to 12 carbon atoms and $R^2$ is a divalent unsubstituted or substituted hydrocarbon oxyalkylene radical.

Conformal coating compositions that cure by exposure to a combination of ultraviolet radiation and atmospheric moisture are described in U.S. Pat. No. 4,528,081, which issued to Lien and Nakos on Jul. 9, 1985 and U.S. Pat. Nos. 4,824,875 and 4,956,221, which issued to Gutek on Apr. 25, 1989 and Sep. 11, 1990, respectively.

Conformal coating compositions that cure by a platinum-catalyzed hydrosilation reaction are described in U.S. Pat. No. 5,082,894, which issued to VanWert and Houghtaling on Jan. 21, 1992. One advantage of the compositions described in these patents is their ability to cure in seconds or several minutes, thereby allowing the substrates to be handled shortly after being coated without damage to the coating.

The "dual cure" compositions described in the aforementioned patents to Lien et al. and Gutek cure rapidly in the areas accessible to ultraviolet radiation, however curing in the shadowed areas is considerably slower, and may require as long as 30 minutes or more, even at temperatures of 30° C. and above, to develop a surface that i s not "tacky" due to insufficient curing. U. S. Pat. No. 5,008,301, which issued to Dennis and VanWert on Apr. 16, 1991 addresses this problem by including an organic peroxide as an ingredient of the curable composition to provide a relative rapid heat activated cure in the shadow areas. The residue and by-products resulting from decomposition of the peroxide can interfere with the operation of electronic components and cause corrosion of the substrate.

The preferred compositions described in the aforementioned VanWert and Houghtaling patent do not contain solvents or reactive diluents and cure in several minutes or less, depending upon the temperature. A shortcoming of coatings prepared using these compositions is their relatively poor strength and durability, which is believed due at least in part to the low molecular weight of the polydiorganosiloxane required to achieve a viscosity for the final curable compositions suitable for application to substrates by dipping or spraying.

Organosiloxane compositions that cure in the presence of atmospheric moisture by reaction of silicon-bonded hydroxyl groups with hydrolyzable groups such as alkoxy and carboxy groups are known, and have been used to prepare curable coating compositions. Alkoxy groups are preferred as the hydrolyzable group because the alcohol produced as a by-product of the curing reaction will not dissolve or corrode the materials used in solid state electronic devices and the substrates, such as copper plated printed circuit boards, on which these devices are mounted.

A curable organosiloxane composition preferred for use as conformal coatings for printed circuit boards and electronic devices contains polyorganosiloxanes with one silanol or at least two alkoxy groups at the terminal positions and a curing catalyst such as an organotin or organotitanium compound. When the polyorganosiloxane contains silanol groups the curable composition includes a silane or other relatively low molecular weight organosilicon compound containing at least two alkoxy groups per molecule.

The present inventors discovered that coatings prepared using solventless compositions containing conventional silanol-terminated polyorganosiloxanes, alkoxysilanes as curing agents and an organotitanium compound as the curing catalyst could be prepared. If the viscosity of the polyorganosiloxane was below about 1 Pa.s the composition could be sprayed, and the initially prepared compositions developed a tack-free surface in 5 minutes or less, which allowed the coated substrate to be handled. The shortcoming of these compositions is that the time required for the composition to form a tack-free surface increased substantially during storage of the composition.

U.S. Pat. No. 4,772,675, which issued to J. Klosowski and M. Meddaugh on Sep. 20, 1988 discusses the loss of curing ability over time that characterizes some moisture curable organosiloxane compositions containing alkoxy groups and titanium catalysts. The solution proposed in this patent is to use alkoxy functional polyorganosiloxanes wherein the alkoxy groups are present as di- or trialkoxysilalkylene terminal units. The terminal silicon atoms of these polyorganosiloxanes contain two or three alkoxy groups and are linked to the adjacent silicon atoms by an alkylene radical such as ethylene rather than by the oxygen atom characteristic of polyorganosiloxanes.

A preferred method for preparing the polyorganosiloxanes described in the Klosowski and Meddaugh patent involves reacting a polyorganosiloxane containing vinyl or other terminally unsaturated alkenyl radical with an "end-capping" organosilicon compound of the formula $HR_2SiOSi(R_2)CH_2CH_2Si(OR')_3$. This organosilicon compound is, in turn, prepared by reaction of a disiloxane $(HR_2Si)_2O$ with a vinyltrialkoxysilane.

The present inventors discovered that when one or more of the curable polyorganosiloxanes prepared as described in the aforementioned U.S. Pat. No. 4,772,675 and the preceding paragraph, is used as the curable ingredient of a coating composition without substantial amounts of inorganic reinforcing fillers such as silica, hydrogen gas was evolved during curing and/or storage of the composition.

Because the curable composition is packaged in a closed container to avoid contact with atmospheric moisture and premature curing, the increase in pressure resulting from generation of a gas in this confined area can result in swelling or bursting of the container in addition to the potential for explosion associated with hydrogen gas.

Depending upon the viscosity of the curable composition and the rate of cure, the generation of hydrogen gas during curing causes foaming or the presence of voids in the final cured material. Either of these is undesirable in a coating.

It is therefore an objective of the present invention to provide coating compositions that do not contain solvents or reactive diluents, are sufficiently low in viscosity to be applied rapidly using conventional coating techniques such as brushing and spraying, can be stored for extended periods of time without any substantial decrease in cure rate or hydrogen generation, and develop a tack- and void-free surface in a sufficiently short time to permit subsequent processing of the coated substrate with only minimal delays.

SUMMARY OF THE INVENTION

The objectives of this invention can be achieved by including a liquid organosilicon compound containing at least one alkenyl radical per molecule in moisture curable organosiloxane compositions containing a polydiorganosiloxane with alkoxysilalkylene terminal units and an organotitanium compound as the curing catalyst. The organosilicon compound reacts with any silicon-bonded hydrogen atoms present in the composition, thereby preventing the generation of hydrogen gas during storage and/or curing of the composition.

DETAILED DESCRIPTION OF THE INVENTION

This invention relates to a liquid curable organosiloxane coating composition comprising (A) a liquid polydiorganosiloxane represented by the formula $(R^3O)_{3-a}R^4_aSiZ(R^1R^2SiO)_xSi(R^1)(R^2)ZSiR^4_a(R^3O)_{3-a}$, where $R^1$, $R^2$ and $R^4$ are individually selected from monovalent hydrocarbon radicals, $R^3$ is an alkyl radical, Z is $R^5$ or $-R^5Si(R^1)(R^2)OSi(R^1)(R^2)R^5-$, $R^5$ is a divalent hydrocarbon radical, a is 0 or 1 and x designates a degree of polymerization sufficient to provide a viscosity of from 0.1 to 1 Pa.s at 25° C., said polydiorganosiloxane is prepared by the reaction of an alkenyl-terminated polydiorganosiloxane and a first organosilicon compound containing a silicon-bonded hydrogen atom and two or three silicon-bonded alkoxy groups per molecule, and said composition contains said organosilicon compound in unreacted form, (B) an amount sufficient to stabilize said composition during storage of at least one silane containing an average of at least two alkoxy groups per molecule, (C) an amount of an organotitanium compound sufficient to promote curing of composition in the presence of atmospheric moisture, and (D) an amount of a second organosilicon compound containing at least one alkenyl radical per molecule sufficient to react with the silicon-bonded hydrogen present in the unreacted portion of said first organosilicon compound, where said composition contains less than 5 weight percent of solvents and reactive diluents.

The viscosity of preferred compositions is from 0.5 to about 5 Pa.s at 25° C.

THE CURABLE POLYDIORGANOSILOXANE (INGREDIENT A)

The curable ingredient of the present compositions is a liquid di- or trialkoxysilalkylene-terminated polydiorganosiloxane represented by formula I

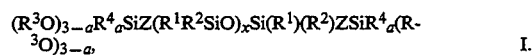

where $R^1$, $R^2$ and $R^4$ are individually selected from monovalent hydrocarbon radicals, $R^3$ is an alkyl radical, Z is $R^5$ or $-R^5Si(R^1)(R^2)OSi(R^1)(R^2)R^5-$, $R^5$ is a divalent hydrocarbon radical, a is 0 or 1 and x is equivalent to a viscosity of from 0.1 to 1 Pa.s at 25° C. This ingredient will be referred to as ingredient A in this specification.

Polymers of this type used as ingredient A are described in U.S. Pat. No. 3,175,993, which issued to Weyenberg on Mar. 30, 1965, and in the aforementioned U.S. Pat. No. 4,772,675.

The monovalent hydrocarbon radicals represented by $R^1$, $R^2$, and $R^4$ can be substituted or unsubstituted. Typical substituents include but are not limited to halogen atoms and cyano groups. When these hydrocarbon radicals are unsubstituted they can be, for example, alkyl such as methyl, ethyl, propyl, isopropyl or n-butyl; cycloalkyl such as cyclopentyl and cyclohexyl; aryl such as phenyl and naphthyl; aralkyl such as benzyl and phenethyl or alkaryl such as tolyl and xylyl. Examples of substituted hydrocarbon radicals include but are not limited to chloromethyl and cyanoethyl.

The alkyl radicals represented by $R^3$ preferably contain from 1 to about 5 carbon atoms, and include but are not limited to methyl, ethyl, n-propyl, iso-propyl and butyl.

The divalent hydrocarbon radical $R^5$ can contain from 2 to 15 carbon atoms in the form of a divalent alkylene or arylene radical such as ethylene, propylene, hexylene, phenylene, and $-CH_2-CH_2-Ph-CH_2-CH_2-$, where Ph represents p-phenylene. In preferred embodiments of Z $R^5$ is ethylene.

Ingredient A can be prepared by reacting a alkenyl-terminated polydiorganosiloxane of the formula

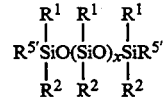

where $R^1$ and $R^2$ are as defined above, $R^{5'}$ is the ethylenically unsaturated equivalent of $R^5$, and x is as defined above with a silane of the formula $HSi(OR^3)_{3-a}R^4_a$ or an endcapping reactant of the formula

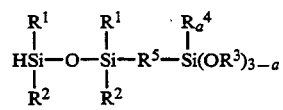

where $R^1$, $R^2$, $R^4$, $R^5$ and a are as defined above. When $R^5$ represents ethylene the endcapping reactant can be produced by a method comprising (A) mixing a vinylalkoxysilane

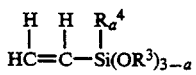

with a disiloxane of the formula

in the presence of a platinum catalyst and allowing the ingredients to react, then, (B) optionally removing unreacted ingredients under reduced pressure.

The method for preparing the endcapping reactant and its use in the manufacture of curable compositions containing an alkoxy functional silane crosslinker and a titanium catalyst, is taught in U.S. Pat. No. 4,772,675, which is hereby incorporated by reference.

The concentration of endcapping reactant (II) is at least sufficient to react with all of the terminal groups on the polydiorganosiloxane. To ensure that all of the ethylenically unsaturated groups are reacted it is preferable to use a stoichiometric excess of the end-capping reactant.

THE STABILIZING ADDITIVE (INGREDIENT B)

Even though the curable polyorganosiloxane ingredient of the present compositions contains at least two alkoxy groups at each terminal position and is therefore capable of forming a crosslinked structure in the presence of moisture, the present compositions include an alkoxy-functional organosilicon compound referred to in this specification as ingredient B. This ingredient substantially increases the storage stability of the curable composition by acting as a moisture scavenger, and also controls the modulus of cured materials prepared using these compositions.

Preferred stabilizing agents are alkoxysilanes of the formula $R^6_bSi(OR^7)_{4-b}$ where $R^6$ is selected from same group as $R^4$, $R^7$ is selected from the same group as $R^3$, and b is 0, 1 or 2. Alkoxy silanes and methods for preparing them are well known.

The amount of ingredient B is preferably from 0.1 to 14 parts by weight, most preferably from 2 to 8 parts, per 100 parts of ingredient A.

When b is 0 or 1, increasing the concentration of ingredient B results in a coating that is harder, with lower elongation. By contrast, when b is 2 ingredient B functions as a chain extender. Increasing the concentration of this embodiment of ingredient B typically produces a softer coating.

THE ORGANOTITANIUM CURING CATALYST (INGREDIENT C)

The reactions involved in curing the present compositions are catalyzed by an organotitanium compound, referred to in the present specification as ingredient C. The titanium compound can be any of those known to be useful in catalyzing the moisture initiated reaction of alkoxy containing siloxanes or silanes. Useful catalysts include but are not limited to titanium naphthenate, titanium esters such as tetrabutyltitanate, tetra-2-ethylhexyltitanate, tetraphenyltitanate, triethanolaminetitanate, organosiloxytitanium compounds such as those described in U.S. Pat. No. 3,294,739, and beta-dicarbonyl titanium compounds such as those described in U.S. Pat. No. 3,334,067, both patents being herein incorporated by reference to show titanium catalyst and methods of manufacture. Preferred catalysts include tetrabutyltitanate, tetraisopropyltitanate, bis-(acetylacetonyl)diisopropyltitanium, and 2,5-di-isopropoxy-bis-ethylacetoacetate titanium. The amount of catalyst is from 0.2 to 6.0 parts by weight, preferably from 0.5 to 3.0 parts by weight, per 100 parts by weight of ingredient A.

The present inventors discovered that catalytic amounts of tin compounds including but not limited to stannous salts of carboxylic acids such as stannous octoate and diorganotin carboxylates such as dibutyltin diacetate accelerate curing of the present compositions without substantially reducing the bath life in the absence of moisture of coating compositions containing the ingredients of the present curable compositions.

THE ALKENYL-SUBSTITUTED ORGANOSILICON COMPOUND (INGREDIENT D)

The novel feature of the present compositions is the presence of a liquid organosilicon compound containing at least one alkenyl radical per molecule. This compound will react with any residual end-capping reactant used to prepare the curable alkoxy-functional polyorganosiloxane and any other compounds containing silicon-bonded hydrogen atoms. This organosilicon compound will be referred to as ingredient D.

Even if only a stoichiometric amount of the end-capping reactant is used to prepare the curable polyorganosiloxane (ingredient A), there is a likelihood that not all of this reactant will be consumed during the preparation of ingredient A.

In the presence of the residual platinum catalyst used to prepare ingredient A, the silicon-bonded hydrogen atoms present in the curable compositions of this invention can react with any water, alcohol or any other hydroxyl group-containing compounds present during storage and/or curing of the composition to form gaseous hydrogen if ingredient D was not present.

Ingredient D can be any organosilicon compound containing at least one silicon-bonded alkenyl radical per molecule. The only restrictions on this ingredient are that it be a liquid, and not interfere with curing of the present compositions or result in an unacceptably high or low viscosity for the composition.

Ingredient D is typically a silane, disiloxane or a low molecular weight polyorganosiloxane containing an average of up to about 20 repeating units per molecule. Liquid alkoxy-functional silanes containing at least one alkenyl radical per molecule are preferred based on the availability of these compounds and their ability to react during curing of the composition and become part of the cured coating rather than remaining as an unreacted liquid.

The alkenyl radical present in ingredient D can contain from 2 to 10 or more carbon atoms. Vinyl, allyl and 5-hexenyl are preferred radicals based on the availability of compounds containing these radicals.

The substituents other than alkenyl radicals that are bonded to the silicon atom(s) of ingredient D include but are not necessarily limited to monovalent hydrocarbon radicals selected from the same group present on the curable polyorganosiloxane, ingredient A, and alkoxy groups. Alkenyltrialkoxysilanes such as vinyltrimethoxysilane are preferred for use as ingredient D based on the compatibility of these compounds with the other ingredients of the curable composition.

The concentration of ingredient D will be determined at least in part by the amount of hydrogen expected to be formed during storage and curing of the present compositions. Concentrations of from 0.1 to about 1 weight percent, based on the total weight of the curable composition are typical.

In accordance with a preferred method for preparing the present compositions ingredient D is added when the curable polyorganosiloxane, ingredient A, is combined with the ingredients B and C to form the present compositions. The alkenyl radicals provide alternative reaction sites for the silicon-bonded hydrogen atoms. This alternative reaction does not generate hydrogen gas as a by-product.

OPTIONAL INGREDIENTS

The curable compositions of this invention can contain a variety of optional ingredients, including reinforcing agents, adhesion promoters, pigments, stabilizers and flame retardants.

Curable organosiloxane, including those of the present invention, can include reinforcing and non-reinforcing fillers. Both types of fillers are well known. The fillers are added to the mixture to provide reinforcement of the polymer to modify the physical properties of cured composition.

Reinforcing fillers such as fumed silica, precipitated silica, and diatomaceous earth are used to increase the physical strength of the cured material. Reinforcing fillers are typically particles having a surface area from about 50 to 700 m$^2$/g. The surface of these fillers can be modified by treatment with various agents to ensure proper interaction between the filler, the curable polyorganosiloxane (ingredient A) and the other ingredients of the composition.

Calcium carbonate fillers are now available which are produced by precipitation which have a surface area of about 20 m$^2$/g that give a reinforcing effect also. Extending fillers such as titanium dioxide, zirconium silicate, calcium carbonate, iron oxide, ground quartz, and carbon black may be used. The amounts of filler used can obviously be varied within wide limits in accordance with the intended use. For example, in some cases the composition could be used without filler, but it would be expected to have poor physical properties.

Reinforcing fillets are commonly used in amounts from about 5 to 60 parts by weight to give the highest physical properties, such as tensile strength. Extending fillers are finely ground in that the average particle size is in the range of from about 1 to 10 micrometers. Extending fillers are used to modify the sealant properties and to provide opacity when this is a requirement.

The adhesion developed between the present compositions and substrates that the compositions are in contact with during curing can be improved by the addition of known adhesion promoters. These adhesion promoters are typically organosilicon compounds containing groups that react with the organosiloxane composition during curing and groups capable of bonding to or otherwise interacting with the substrate. Adhesion promoters suitable for use with the present compositions contain silicon-bonded hydrolyzable groups such as alkoxy groups, and organofunctional groups such as epoxy and/or amino.

Preferred adhesion promoters include but are not limited to epoxy-substituted alkoxysilanes such as 3-glycidoxypropyltrimethoxysilane and reaction products of these silanes with amino-substituted alkoxysilanes such as 3-aminopropyltrimethoxysilane and 3[2-(N,N-dimethylaminoethyl)amino]propyltrimethoxysilane.

PREPARATION OF CURABLE COMPOSITIONS

The present curable compositions are particularly suitable for use as coatings. In accordance with a preferred method for preparing these compositions ingredient A is blended with any filler, and the resultant mixture is de-aired prior to being blended in the absence of moisture with the required amounts of stabilizer (ingredient B), titanium catalyst (ingredient C), and the alkenyl-functional organosilicon compound (ingredient D).

Ingredients B, C and D can be added separately to ingredient A or they can be mixed together and then added as a blend to ingredient A. The resultant curable composition is then preferably deaired, then packaged in moisture impermeable containers, such as sealant cartridges, for storage until it is to be used. Alternatively, a vinyl-terminated precursor of ingredient A, the endcapping reactant required to prepare ingredient A and a platinum group metal containing hydrosilation catalyst are blended together, followed by ingredients B, C and D and any optional ingredients such as fillers. The final mixture is deaired prior to packaging and storage.

The present curable compositions do not exhibit the increase in "tack-free time" with storage characteristic of similar compositions containing conventional moisture curable polyorganosiloxanes having hydroxyl groups bonded to the terminal silicon atoms. For purposes of the present invention "tack-free time" is defined as the elapsed time required for the curable composition to develop a surface that is not sticky to the touch following exposure of the composition to atmospheric moisture.

The following examples describe preferred embodiments of the present curable compositions and should not be interpreted as limiting the scope of the invention defined in the accompanying claims. Unless otherwise indicated all parts and percentages in the examples are by weight and viscosities were measured at 25° C.

EXAMPLE 1

This example demonstrates the gas generation that occurs in the absence of an alkenyl-substituted organosilicon compound.

An alkoxy terminated polydiorganosiloxane (ingredient A1) was prepared by blending 88.9 parts of a dimethylvinylsiloxy-terminated polydimethylsiloxane having a viscosity of about 0.4 Pa.s at 25° C. (Polyorganosiloxane 1) with 0.04 part of a reaction product of hexachloroplatinic acid and symtetramethyldivinyldisiloxane that has been diluted with a liquid dimethylvinylsiloxy terminated polydimethylsiloxane in an amount sufficient to achieve a platinum content of 0.7 weight percent (catalyst 1) and 4.7 parts of

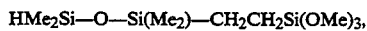

where Me represents methyl (reactant 1), and the resultant mixture (I) was blended at 25° C. for two hours.

4 parts of methyltrimethoxysilane (ingredient B1) was blended under dry nitrogen with 0.4 part of 3-glycidoxypropyltrimethoxysilane (adhesion promoter 1) and 2 parts of 2,5-di-isopropoxy-bis-ethylacetoacetate titanium as a curing catalyst (ingredient C1) to form mixture II, which was then blended with mixture I under dry nitrogen to form a curable composition. This composition did not contain an alkenyl-substituted organosilicon compound, and is included for purposes of comparison.

This composition had a viscosity of 650 cps. (0.65 pa.s). Numerous bubbles of a gas developed in the composition during storage over a 30 day period. A 0.005 inch (0.13 mm.)-thick layer of the composition was applied by spraying to one surface of a copper plated glass fiber reinforced epoxy circuit board referred to as an FR-4 board. The copper coating was in the form of a printed circuit. The coating developed a tack-free surface within 8 to 10 minutes after being applied. After curing for 7 days the adhesion of the coating was evaluated by exposing the coated board to a vapor of salt water at a temperature of about 95° C. The coating adhered well to tile unplated sections of the printed circuit board but not to the copper.

When 0.4 weight percent, based on the weight of the curable composition, of aluminum acetylacetonate, was added to the composition the cured composition developed adhesion to the copper plated sections in 24 hours. Aluminum acetylacetonate is known to catalyze the polymerization of epoxide compounds.

When 0.4 weight percent, based on the weight of the curable composition, of a reaction product of 1 part of 3-glycidoxypropyltrimethoxysilane and 0.35 part of 3-aminopropyltrimethyoxysilane (adhesion promoter 2) was added to the curable composition, the composition developed excellent adhesion to the copper portion of the printed circuit board in 5 hours or less following application.

EXAMPLE 2

This example demonstrates the ability of an alkenyl-substituted organosilicon compound to eliminate gas generation in the present compositions.

A curable composition of this invention was prepared using the following amounts of ingredients described in example 1:

An alkoxy-terminated polydiorganosiloxane (ingredient A2) was prepared by reacting 86.98 parts of polyorganosiloxane 1, 4.6 parts of reactant 1, and 0.04 part of catalyst 1. 0.15 part of an ultraviolet-fluorescing dye available as Uvitex(R) OB was blended with 3.18 parts of ingredient B1. To the resultant solution were added, with stirring, 0.4 part of adhesion promoter 1, 0.73 part of vinyltrimethoxysilane as the alkenyl-substituted organosilicon compound, 1.96 parts of ingredient C1 as the curing catalyst, and 1.96 parts of a mixture of cyclic polydimethylsiloxanes as a viscosity control additive. The resultant mixture was added to ingredient A1 and blended to homogeneity to form a curable composition of the present invention.

This composition was coated on to a copper plated FR-4 board and allowed to cure as described in Example 1. The time required to achieve a tack-free surface was 10 minutes both for a freshly prepared composition and for one that had been stored for 4 months. There was no evidence of gas formation in either composition.

Both of the cured compositions adhered to the non-plated sections of the FR-4 board but not to the copper plating. The addition of either aluminum acetylacetonate or adhesion promoter 2 as described in Example 1 had the favorable effects on adhesion described in that Example.

EXAMPLE 3

This comparative example demonstrates the increase in time required to achieve a tack-free surface that occurs during storage of moisture curable compositions containing an hydroxyl-terminated polydimethylsiloxane, an alkoxysilane as the curing agent and an organotitanium compound as the catalyst. A curable organosiloxane composition was prepared by blending to homogeneity under a dry nitrogen atmosphere 93.5 parts of silanol-terminated polydimethylsiloxane having a viscosity of 0.1 pa.s, 6 parts of methyltrimethoxysilane and 0.5 part of tetrabutyl titanate. The freshly prepared composition was exposed to atmospheric moisture and developed a tack-free surface in 15 minutes. This time interval increased to 16 hours when the curable composition was stored under nitrogen for seven months prior to exposure to atmospheric moisture.

That which is claimed is:

1. A liquid curable organosiloxane coating composition comprising
   (A) a liquid polydiorganosiloxane represented by the formula $(R^3O)_{3-a}R^4_aSiZ\text{---}(R^1R^2SiO)_xSi(R^1)(R^2)\text{-}ZSiR^4_a(R^3O)_{3-a}$, where $R^1$, $R^2$ and $R^4$ are individually selected from monovalent hydrocarbon radicals, $R^3$ is an alkyl radical, Z is $R^5$ or $\text{---}R^5Si(R^1)(R^2)OSi(R^1)(R^2)R^5\text{---}$, $R^5$ is a divalent hydrocarbon radical, a is 0 or 1 and x is equivalent to a viscosity of from 0.1 to 1 Pa.s at 25° C., said polydiorganosiloxane is prepared by the reaction of an alkenyl-terminated polydiorganosiloxane and a first organosilicon compound containing a silicon-bonded hydrogen atom and two or three silicon-bonded alkoxy groups per molecule, and said composition contains said organosilicon compound in unreacted form,
   (B) an amount sufficient to stabilize said composition during storage of at least one silane containing an average of at least two alkoxy groups per molecule,
   (C) an amount of an organotitanium compound sufficient to promote curing of composition in the presence of atmospheric moisture, and
   (D) an amount of a second organosilicon compound containing at least one alkenyl radical per molecule sufficient to react with the silicon-bonded hydrogen present in the unreacted portion of said first organosilicon compound,
   where said second organosilicon compound is a liquid and said composition contains less than 5 weight percent of solvents and reactive diluents.

2. A composition according to claim 1 where said second organosilicon compound is selected from the group consisting of silanes, disiloxanes and polyorganosiloxanes, the alkenyl radical present in said second organosilicon compound contains from 2 to 10 carbon atoms, the silicon-bonded substituents other than said alkenyl radical present in said second organosilicon compound are selected from the group consisting of $R^1$ and alkoxy groups; $R^1$, $R^2$ and $R^4$ are individually selected from the group consisting of alkyl, substituted alkyl, cycloalkyl and aryl radicals; $R^3$ contains from 1 to 5 carbon atoms; $R^5$ is alkylene containing from 2 to 5 carbon atoms; a is 0; the concentration of said organotitanium compound C is from 0.2 to 6.0 percent, based on the weight of said polydiorganosiloxane A, said silane B is an alkoxysilane of the formula $R^6_b Si(OR^7)_{4-b}$ where $R^6$ is selected from same group as $R^4$, $R^7$ is selected from the same group as $R^3$, b is 0, 1 or 2, and the viscosity of said composition is from 0.1 to 5 Pa.s at 25° C.

3. A composition according to claim 2 where said second organosilicon compound is a silane and constitutes from 0.1 to 1 percent of the total weight of said composition, said alkenyl radical is vinyl or 5-hexenyl, the substituents bonded to the silicon atom of said second organosilicon in addition to said alkenyl radical are alkoxy groups, $R^1$ is methyl, $R^2$ and $R^4$ are selected from the group consisting of methyl, phenyl and 3,3,3-trifluoropropyl, $R^3$ is methyl or ethyl, $R^5$ is ethylene, $R^6$ and $R^7$ are alkyl radicals containing from 1 to 5 carbon atoms, b is 1, and the concentration of said silane B is from 0.1 to 14 parts per 100 parts of said liquid polydiorganosiloxane A, and the concentration of said organotitanium compound C is from 0.5 to 3 parts by weight per 100 parts of said liquid polydiorganosiloxane A.

4. A composition according to claim 3 where $R^6$ and $R^7$ are methyl and the concentration of said silane B is from 2 to 8 parts by weight per 100 parts of said liquid polydiorganosiloxane A.

* * * * *